(12) United States Patent
Sim et al.

(10) Patent No.: US 11,138,563 B2
(45) Date of Patent: Oct. 5, 2021

(54) METHOD AND SYSTEM FOR MANAGING ELECTRONIC MESSAGES IN A CLOSED NETWORK

(75) Inventors: Wong Hoo Sim, Singapore (SG); Teck Seng Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 760 days.

(21) Appl. No.: 13/143,979

(22) PCT Filed: Dec. 14, 2009

(86) PCT No.: PCT/SG2009/000478
§ 371 (c)(1),
(2), (4) Date: Jul. 11, 2011

(87) PCT Pub. No.: WO2010/082899
PCT Pub. Date: Jul. 22, 2010

(65) Prior Publication Data
US 2011/0276337 A1 Nov. 10, 2011

(30) Foreign Application Priority Data
Jan. 19, 2009 (SG) .............................. 200900357-5

(51) Int. Cl.
*H04L 29/06* (2006.01)
*G06Q 10/10* (2012.01)
*G06Q 10/06* (2012.01)

(52) U.S. Cl.
CPC .......... *G06Q 10/107* (2013.01); *G06Q 10/06* (2013.01)

(58) Field of Classification Search
USPC ............... 705/1.1, 40, 44, 34, 345; 709/206
See application file for complete search history.

(56) References Cited

U.S. PATENT DOCUMENTS

| 5,771,289 A | 6/1998 | Kuzma |
| 2003/0046160 A1 | 3/2003 | Paz-Pujalt et al. |
| 2003/0204568 A1* | 10/2003 | Bhargava ............ H04M 1/7243 709/206 |

(Continued)

FOREIGN PATENT DOCUMENTS

| CN | 1459760 A | 12/2003 |
| CN | 1464418 A | 12/2003 |

(Continued)

OTHER PUBLICATIONS

Kraut R E et al., Pricing Electronic Mail to Solve the Problem of Spam, Human Computer Interaction, vol. 20 Issue 1 & 2, Jun. 2005, pp. 195-223, pp. 201, 202, 204 218 and 221.

*Primary Examiner* — Lynda Jasmin
*Assistant Examiner* — Kimberly L Evans
(74) *Attorney, Agent, or Firm* — Merchant & Gould P.C.

(57) ABSTRACT

There is provided a method and system for managing electronic messages in a closed network. Both the method and system include determining a quantity of credits to be expended for a transmission of each electronic message from a device in the closed network; and deducting the quantity of credits from a sender's account at a central credit repository. Preferably, the quantity of credits to be expended is dependent on an identity of a recipient of the electronic message. The identity of the recipient of the electronic message may preferably be associated with the recipient's position in an organizational hierarchy.

9 Claims, 3 Drawing Sheets

(56) References Cited

U.S. PATENT DOCUMENTS

| | | | | |
|---|---|---|---|---|
| 2006/0010217 A1* | 1/2006 | Sood | ................ | H04L 51/12 |
| | | | | 709/206 |
| 2006/0041505 A1* | 2/2006 | Enyart | ................ | H04L 51/00 |
| | | | | 705/40 |
| 2008/0027839 A1* | 1/2008 | O'Regan | ................ | H04W 4/24 |
| | | | | 705/34 |
| 2008/0103972 A1* | 5/2008 | Lane | ................ | G06Q 20/4012 |
| | | | | 705/44 |
| 2010/0077041 A1* | 3/2010 | Cowan | ................ | G06F 15/16 |
| | | | | 709/206 |

FOREIGN PATENT DOCUMENTS

| | | |
|---|---|---|
| WO | 00/54190 A2 | 9/2000 |
| WO | 2004/071035 A1 | 8/2004 |

* cited by examiner

METHOD AND SYSTEM FOR MANAGING ELECTRONIC MESSAGES IN A CLOSED NETWORK

FIELD OF INVENTION

This invention relates to the field of closed network electronic messaging, primarily in relation to an electronic messaging system and a method for managing electronic messages.

BACKGROUND

There is an increasing acceptance on a global scale regarding the use of electronic messages for both commercial and personal communications. Inter-party communications have been bolstered by the widespread adoption of communication using electronic messages. Common forms of electronic messages include, for example, electronic mails (e-mails), short message service messages (SMS-es), instant messaging texts (IM texts), multimedia message service messages (MMS-es) and so forth. One reason for the increasing acceptance of electronic messages is due to ease of accessibility to facilities which enable the transmission and reception of electronic messages. Electronic messages may be composed and received on a readily accessible range of devices such as, for example, a desktop computer, a mobile phone, a notebook, a PDA, a media player, gaming consoles, and so forth.

Unfortunately, the popularity of electronic messages has led to many people being regularly inundated with a huge number of electronic messages. This has led to a highly undesirable situation whereby a large amount of time is regularly expended to sift through content in each of the huge number of electronic messages, and this time is expended wastefully if the huge number of electronic messages includes messages with "junk messages" (also known as spam), containing, for example, ads, irrelevant content, trivial content and so forth. This wastage of time detrimentally minimizes productivity of the recipient of the huge number of electronic messages.

The aforementioned problem of recipients with a huge number of electronic messages is especially prevalent for people who are in the higher echelons of an organizational hierarchy. These people in the higher echelons are often copied on numerous electronic messages sent by their subordinate(s) primarily for the sake of being informed of particular situations and/or developments, with their involvement for each particular situation not being significant in nature. Given that these people in the higher echelons typically need time to properly run an organization in a favourable manner, the wastage of their time to review non-essential electronic messages is highly detrimental to the organization's overall effectiveness and well-being.

The high volume of email creates another problem in relation to resources needed to manage the high volume of emails. The higher the volume, the greater the amount and correspondingly, cost of resources required to process tasks such as, for example, transmitting electronic messages, hosting electronic messages, archiving electronic messages, and so forth.

Furthermore, in today's electronic messaging environment, a sender of an electronic message has a very limited degree of accountability solely based on having the sender's identity being associated with the electronic message. There is no other form of accountability for a sender of an electronic message. Indiscriminant sending of electronic messages stemming from a lack of cost (either financial or any quantifiable unit) to the sender unnecessarily hogs data bandwidth and other information systems resources as well. For instance, there may be congestion on a mail server, problems backing up/archiving data, and so forth. This is detrimental to the efficiency of data transmission for interconnected data networks worldwide. Delays in electronic message transmission and reception may be annoying, detrimental or both of the aforementioned depending on a particular situation.

In light of the aforementioned, it would be preferable if a system and a method for managing electronic message (both incoming and outgoing) were able to overcome the aforementioned problems.

SUMMARY

In a first aspect, there is provided a method for managing electronic messages in a closed network. The method includes determining a quantity of credits to be expended for a transmission of each electronic message from a device in the closed network; and deducting the quantity of credits from a sender's account at a central credit repository. Preferably, the quantity of credits to be expended is dependent on an identity of a recipient of the electronic message. The identity of the recipient of the electronic message may preferably be associated with the recipient's position in an organizational hierarchy.

The method may further include receiving a relevance rating of the electronic message; and crediting an incentive credit quantity to a recipient's account at the central credit repository. It is preferable that the relevance rating is made by the recipient of the electronic message. The method may include either crediting or deducting at least one credit from the sender's account at a central credit repository in accordance with the relevance rating of the electronic message. The method may also include notifying the sender on the relevance rating of the electronic message, with the sender being able to receive an indication of a relevance of the electronic message to the recipient. The relevance rating may be in a form such as, for example, descriptive, numerical, graphical and so forth.

The electronic message may preferably be selected from, for example, electronic mails, short message service messages, instant messaging texts, multimedia message service messages and so forth.

The device may be selected from, for example, a desktop computer, a mobile phone, a notebook, a PDA, a media player, and a gaming console. The accounts at the central credit repository may advantageously be analysed to determine at least one of behaviourial patterns, and electronic messaging usage patterns of users. The accounts at the central credit repository may be topped up to a predetermined level after a fixed time period such as, for example, weekly, fortnightly, monthly, quarterly and so forth. Preferably, when an account at the central credit repository is at an insufficient level, a user of the account is unable to utilize electronic messaging in the closed network.

In a second aspect, there is provided a system for managing electronic messages in a closed network. The system includes a central credit repository; and at least one device for transmission and reception of electronic messages. It is preferable that the central credit repository and the at least one device are connected to the closed network, with the central credit repository being for administering credits used in the system for managing electronic messages.

The electronic message may include, for example, electronic mails, short message service messages, instant messaging texts, multimedia message service messages and so forth. The device may include, for example, a desktop computer, a mobile phone, a notebook, a PDA, a media player, a gaming console and so forth.

It is preferable that the central credit repository includes accounts for users of electronic messages in the closed network, the accounts at the central credit repository being analysed to determine at least one of behaviourial patterns, and electronic messaging usage patterns of users. The accounts at the central credit repository may be topped up to a predetermined level after a fixed time period like, for example, weekly, fortnightly, monthly, quarterly and the like. When an account at the central credit repository is at an insufficient level, a user of the account is unable to utilize at least one form of electronic messaging in the closed network, where the at least one form of electronic messaging is selected from, for example, sending electronic messages, receiving electronic messages, both the aforementioned and the like.

Preferably, the method of the first aspect is enabled by the system of the second aspect.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
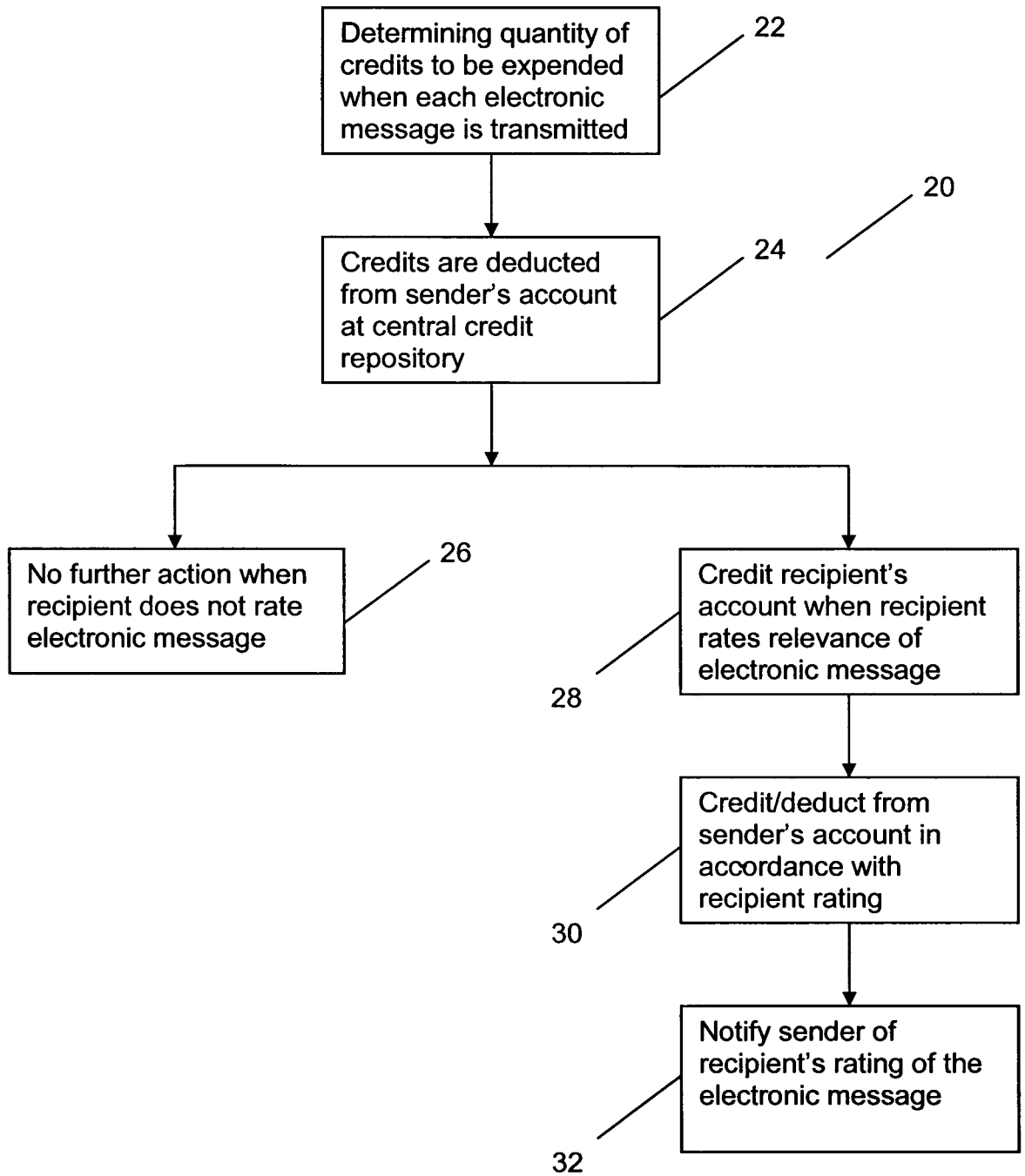
FIG. 1 shows a process flow for a method of the present invention.

Referring to FIG. 1, there is provided a first aspect of the present invention, the first aspect being a method 20 for managing electronic messages in a closed network. It should be appreciated that electronic messages include, for example, electronic mails (e-mails), short message service messages (SMS-es), instant messaging texts (IM texts), multimedia message service messages (MMS-es) and so forth. The electronic messages may be transmitted and received on a device such as, for example, a desktop computer, a mobile phone, a notebook, a PDA, a media player, a gaming console, and so forth. The aforementioned devices may be configured to transmit and receive the electronic messages with enablement from an electronic messaging application(s) configured to operate on each device. The closed network may be, for example, an intra-office network, a localized network and so forth. Each device may be used by more than one user in a manner where each device is not associated with a particular user. Similarly, the user may use more than one device in a manner where the user profile is usable across different devices/platforms.

The method 20 involves use of credits which may be administered by a central credit repository where every user of electronic messages (both senders and recipients) has at least one account with the central credit repository. The at least one account may be associated with either the user of electronic messages or at least one electronic messaging account. The credits may be in a form of either currency for legal tender or digital quantitative credits. The digital quantitative credits may be convertible to currency for legal tender and vice versa. Each user's account may be analysed regularly over predetermined time periods to determine behaviourial patterns and/or electronic messaging usage patterns of the user. For example, use of a high or a low volume of digital quantitative credits over a predetermined period of time may indicate certain electronic messaging characteristics of the user. The central credit repository may be continually connected to the closed network where any deduction/credit to a user's account at the central credit repository can be carried out at any juncture. Behaviourial patterns may include, for example, a penchant to send electronic messages to recipients at high levels of an organizational hierarchy, a penchant to repeatedly send chaser electronic messages, and so forth. Similarly, electronic messaging usage patterns may include, for example, copying many recipients for electronic messages, forwarding many recipients electronic messages, and the like.

The method 20 includes determining a quantity of credits to be expended when each electronic message is transmitted 22. The quantity of credits to be expended may be determined from a recipient's identity. The recipient's position in an organizational hierarchy may be associated with the recipient's identity. The quantity of credits is deducted from a sender's account at the central credit repository 24. In a preferred embodiment, a first recipient who is of a higher level in an organizational hierarchy would cause a higher quantity of credits to be expended compared to a second recipient who is of a lower level in the same organizational hierarchy. Each level in the organizational hierarchy may include more than one entity, where each entity in the same level in the organizational hierarchy may have an identical rank/standing in the organization. For example, if an organization is divided into five levels in descending level of strategic importance (A, B, C, D, E), sending an electronic message to someone in level A would expend ten credits from the sender's account at the central credit depository, sending an electronic message to someone in level B would expend eight credits from the sender's account at the central credit depository, sending an electronic message to someone in level C would expend six credits from the sender's account at the central credit depository, and so forth.

In the method 20, a recipient of an electronic message may be able to rate a relevance of the electronic message. However, if the recipient does not rate the relevance of the electronic message, no further action is performed on the accounts of both the sender and recipient 26.

When the recipient rates the relevance of the electronic message, the rating may be transmitted to the central credit depository for processing. The recipient may rate the relevance of the electronic message after reviewing contents of the electronic message. Rating options available to the recipient may include, for example, irrelevant, relevant, urgent, and so forth. It should be appreciated that the ratings irrelevant, relevant, and urgent are merely illustrative, and the ratings may take a form of numerals (for example, a scale of one to five), indicia (for example, a scale of one tick to five ticks) and so forth. The rating options may be made available to the recipient prior to the closure of the electronic message after the recipient has reviewed the contents of the electronic message, the forwarding of the electronic message after the recipient has reviewed the contents of the electronic message, or the reply to the electronic message after the recipient has reviewed the contents of the electronic message. It should be appreciated that either an overly lengthy electronic message or an electronic message with a large-sized attachment may be deemed to be irrelevant even if a small portion of either the electronic message or the attachment is useful. The ratings are thus rather subjective.

Figure 2:
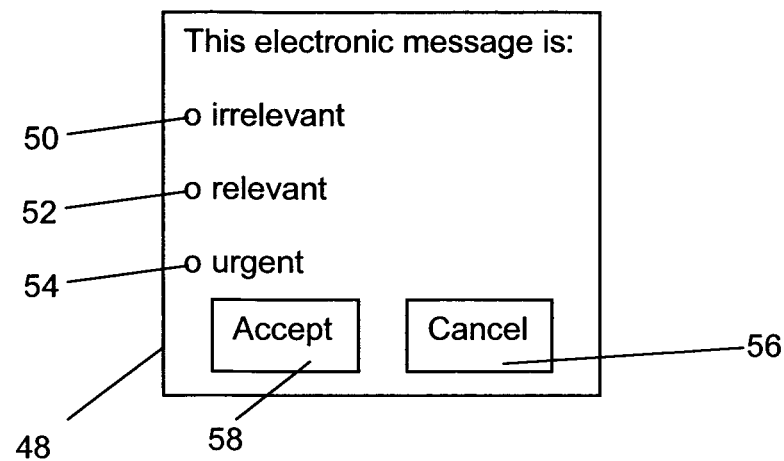
FIG. 2 shows a sample representation of an electronic message rating box of the present invention.

The rating option may take a form of a pop-up box 48 as shown in FIG. 2. When the recipient of the electronic message rates the electronic message using the pop-up box 48 as shown in FIG. 2, the recipient may also have one credit (for example) credited into the recipient's account at the central credit repository 28. This credit incentive may also be provided by the central credit repository. The recipient does not have any credit credited into the recipient's account at the central credit repository if the "cancel" 56 option is selected by the recipient.

In a non-limiting example when the rating options in the pop-up box 48 are irrelevant 50, relevant 52 and urgent 54, selection of the "irrelevant" 50 option by the recipient will cause the sender to expend two additional credits (deducted from the sender's account in the central credit repository), while selection of the "relevant" 52 and "urgent" 54 options will enable the sender to receive a credit rebate of one and two credits respectively (the credit rebate is credited into the sender's account in the central credit repository) 30 when an "Accept" option 58 is selected by the recipient. The "Cancel" option 56 may also be selected if the recipient does not wish to rate the electronic message. It should be appreciated that the credit rebate may be provided by the central credit repository.

By being able to rate an incoming electronic message, the recipient is able to penalize an indiscriminant sender(s) of electronic messages and is also rewarded by bolstering a credit level of the recipient's account at the central credit repository. A penalty quantum and credit rebate may be pre-determined in accordance with a set of guidelines, such as, for example, company policies. The rating option selected by the recipient may be made known to the sender 32. The rating option may be made known to the sender via another electronic message from the recipient. Informing the sender of the recipient's rating option aids the sender in improving the sender's electronic message usage patterns. The sender would not send further electronic messages to a recipient who deems a particular subject matter to be "irrelevant" in order to avoid being penalized by the recipient. As such, it is evident that indiscriminant sending of electronic messages is likely to be minimized in the closed network.

Each user's account at the central credit repository may be configured in a manner where the user may not utilize electronic messaging in the closed network once a credit level of each user's account reaches zero. In this manner, the user will typically prevent the credit level in their own account to reach zero to ensure that electronic messaging is accessible in the closed network. Each user's account may be topped up to a predetermined level after a fixed time period, such as, for example, weekly, fortnightly, monthly, quarterly, and so forth.

The method 20 penalizes senders of "irrelevant" electronic messages and senders of electronic messages to recipients at a higher level in an organizational hierarchy. Thus, due care has to be exercised by senders of electronic messages in order to ensure continual accessibility to electronic messaging in the closed network. It should be appreciated that either an overly lengthy electronic message or an electronic message with a large-sized attachment may be deemed to be irrelevant even if a small portion of either the electronic message or the attachment is useful. The ratings are thus rather subjective.

Figure 3:
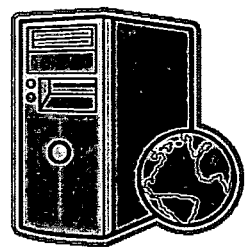
FIG. 3 shows a system overview of the present invention.
Figure 3:
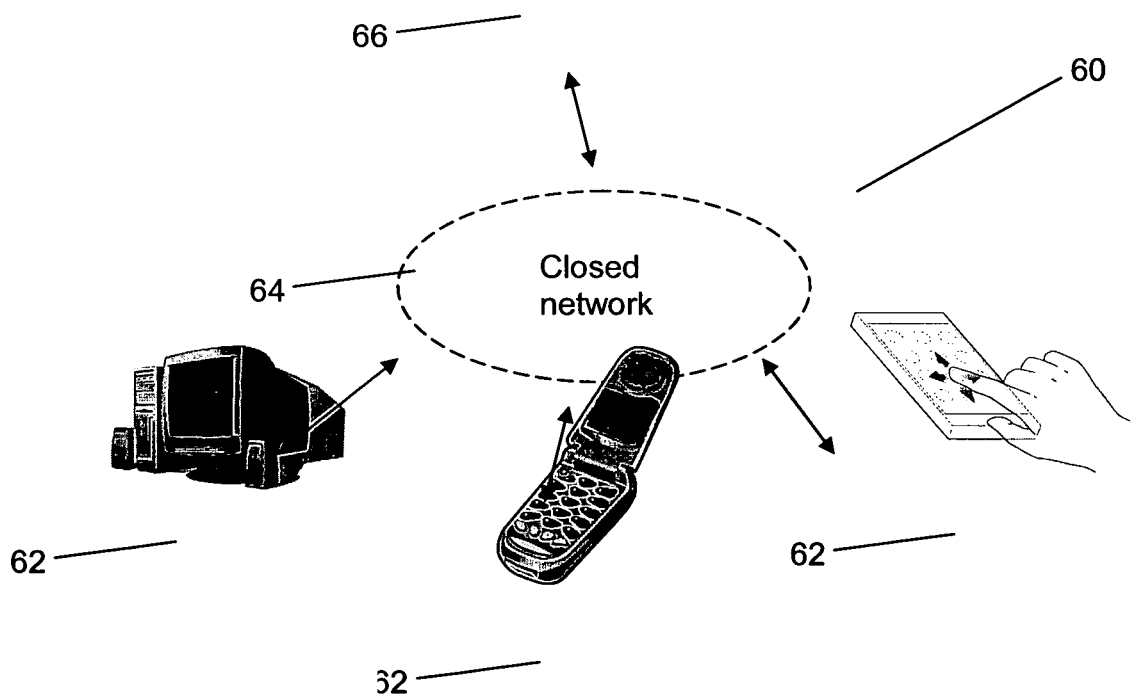

Referring to FIG. 3, there is shown a system 60 overview of the present invention. The system 60 may be employed within a closed network 64. The system 60 enables the aforementioned method 20 to be carried out. The system 60 includes a plurality of devices 62, each device 62 being for the transmission and reception of electronic messages. It should be appreciated that electronic messages include, for example, electronic mails (e-mails), short message service messages (SMS-es), instant messaging texts (IM texts), multimedia message service messages (MMS-es) and so forth. The devices 62 may include, for example, a desktop computer, a mobile phone, a notebook, a PDA, a media player, a gaming console, and so forth. The devices 62 may transmit and receive the electronic messages with enablement from an electronic messaging application(s) configured to operate on each device 62. The closed network 64 may be, for example, an intra-office network, a localized network and so forth. Each device 62 may be used by more than one user in a manner where each device is not associated with a particular user. Similarly, the user may use more than one device in a manner where the user profile is usable across different devices/platforms.

Each of the plurality of devices 62 may be connectable to the closed network 64 either wirelessly or by a wired connection. The wireless connection of the plurality of devices 62 may be enabled by use of wireless technologies such as, for example, UWB, Bluetooth, Wi-Fi, or any form of radio frequency transmission.

The system 60 may also include a central credit repository 66. The central credit repository 66 administers credits which may be used in the aforementioned method 20. In the system 60, every user of electronic messages (both senders and recipients) has at least one account with the central credit repository 66. The credits may be in a form of either currency for legal tender or digital quantitative credits. The digital quantitative credits may be convertible to currency for legal tender and vice versa. Each user's account may be analysed regularly over predetermined time periods to determine behaviourial patterns and/or usage patterns of the user. For example, use of a high or a low volume of digital quantitative credits over a predetermined period of time may indicate certain electronic messaging characteristics of the user. Behaviourial patterns may include, for example, a penchant to send electronic messages to recipients at high levels of an organizational hierarchy, a penchant to repeatedly send chaser electronic messages, and so forth. Similarly, electronic messaging usage patterns may include, for example, copying many recipients for electronic messages, forwarding many recipients electronic messages, and the like.

The central credit repository 66 may be continually connected to the closed network 64 such that any deduction/credit to a user's account at the central credit repository 66 can be carried out at any juncture. The central credit repository may be connectable to the closed network 64 either wirelessly or by a wired connection. The wireless connection of the central credit repository 66 may be enabled by use of wireless technologies such as, for example, UWB, Bluetooth, Wi-Fi, or any form of radio frequency transmission.

Figure 4:
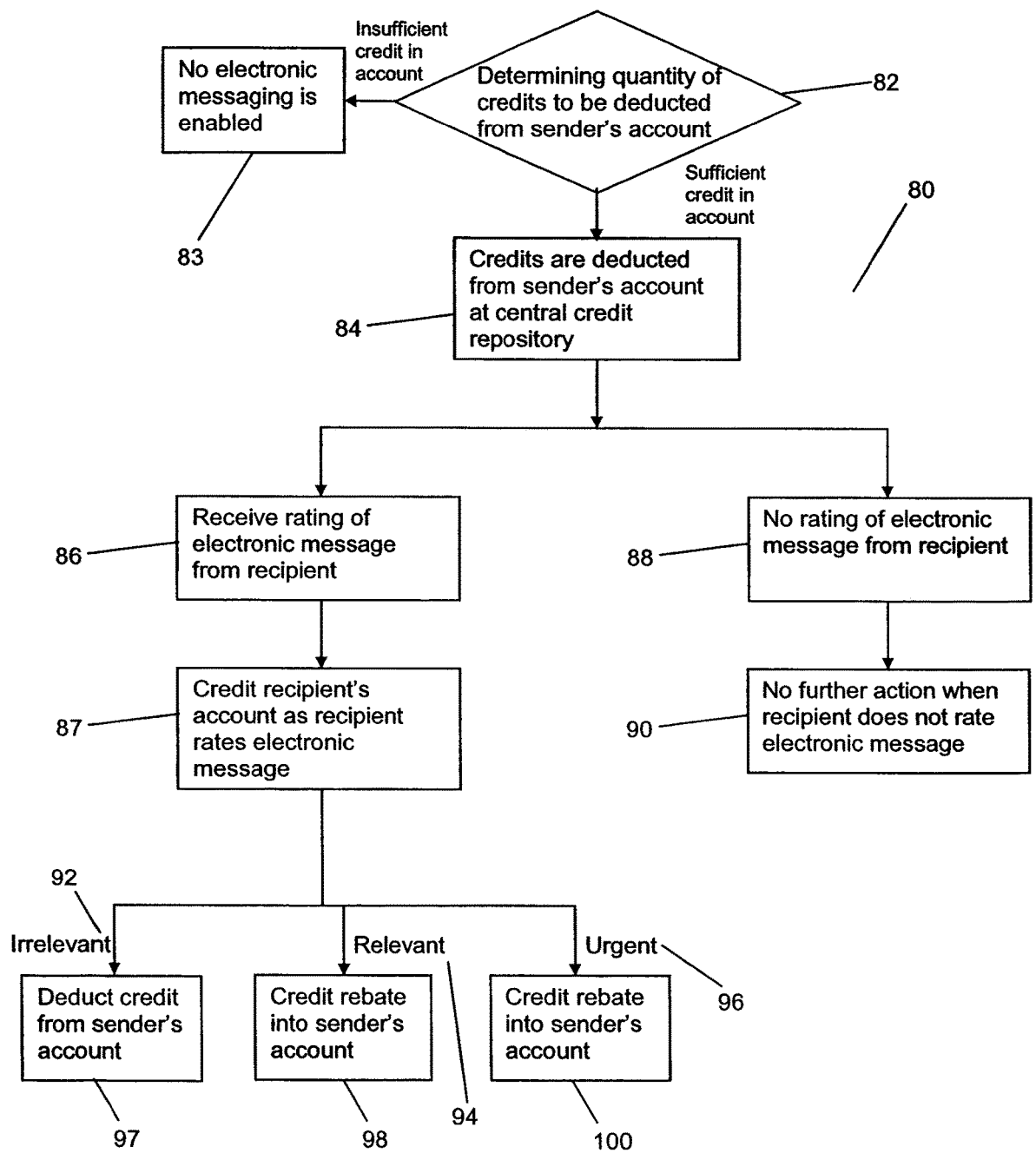
FIG. 4 shows a process flow for a central credit repository of the system of the present invention.

Referring to FIG. 4, there is shown a process flow 80 for a central credit repository 66 of the system 60. Firstly, the central credit repository 66 determines a quantity of credits to be deducted 82 from a sender's account at the central credit repository 66 when an electronic message is transmitted from a first device 62 to at least one other device 62. The requisite quantity of credits to be deducted may be determined from a recipient's identity. The recipient's position in an organizational hierarchy may be associated with the recipient's identity. If there are insufficient credits at the sender's account at the central credit repository 66, no electronic messaging is enabled 83 for use by the sender.

In a preferred embodiment, a first recipient who is of a higher level in the organizational hierarchy would cause a higher quantity of credits to be deducted from the sender's account compared to a second recipient who is of a lower level in the same organizational hierarchy. Each level in the organizational hierarchy may include more than one entity, where each entity in the same level in the organizational hierarchy may have an identical rank/standing in the organization. For example, if an organization is divided into five levels in descending level of strategic importance (A, B, C, D, E), sending an electronic message to someone in level A would deduct ten credits from the sender's account at the central credit repository 66, sending an electronic message to someone in level B would deduct eight credits from the sender's account at the central credit repository 66, sending an electronic message to someone in level C would deduct six credits from the sender's account at the central credit repository 66, and so forth. The deduction of credits may also be determined by an algorithm if it involves broadcasting electronic messages to a large group of recipients. The use of the algorithm may be more efficient than counting a large group of recipients individually.

If there are sufficient credits in the sender's account at the central credit repository 66, the requisite number of credits is then deducted from the sender's account 84 at the central credit repository 66. Subsequently, the central credit repository 66 would receive a rating from a recipient in relation to a relevance of the electronic message 86. The recipient of an electronic message may be able to rate the relevance of the electronic message after reviewing contents of the electronic message. Rating options available to the recipient may include, for example, irrelevant, relevant, urgent, and so forth. It should be appreciated that the ratings irrelevant, relevant, and urgent are merely illustrative, and the ratings may take a form of numerals (for example, a scale of one to five), indicia (for example, a scale of one tick to five ticks) and so forth. The rating options may be made available to the recipient prior to the closure of the electronic message after the recipient has reviewed the contents of the electronic message, the forwarding of the electronic message after the recipient has reviewed the contents of the electronic message, or the reply to the electronic message after the recipient has reviewed the contents of the electronic message.

If the central credit repository 66 receives a rating in relation to the electronic message from the sender 86, an account of the recipient at the central credit repository 66 is credited with one credit (for example) 87 as an incentive for the recipient to rate the electronic message. By being able to rate an incoming electronic message, the recipient is able to penalize an indiscriminant sender(s) of electronic messages and is also rewarded by bolstering a credit level of the recipient's account at the central credit repository 66.

If the central credit repository 66 does not receive a rating in relation to the electronic message from the sender 88, there is no further deduction/crediting of credits in the respective accounts of both the sender and the recipient 90.

In the instance when the recipient sends the rating, when the recipient rates the electronic message as "irrelevant" 92, further credits (for example two credits) are deducted from the sender's account 97 at the central credit repository 66. When the recipient rates the electronic message as "relevant" 94, the sender's account at the central credit repository 66 is credited with a rebate of one unit (for example) 98.

Finally, when the recipient rates the electronic message as "urgent" 96, the sender's account at the central credit repository 66 is credited with a rebate of two units (for example) 100. It should be appreciated that the credit rebate may be provided by the central credit repository 66. A penalty quantum and credit rebate may be pre-determined in accordance with a set of guidelines, such as, for example, company policies.

Whilst there has been described in the foregoing description preferred embodiments of the present invention, it will be understood by those skilled in the technology concerned that many variations or modifications in details of design or construction may be made without departing from the present invention.

The invention claimed is:

1. A method implemented by an electronic messaging system for managing electronic messages of one or more devices in a closed network, the method including:
   determining a quantity of credits to be expended for a transmission of each electronic message from a sender's device in the closed network;
   deducting the quantity of credits from the sender's account at a server, the server comprising a central credit repository;
   generating a user interface that enables a recipient of the electronic message to input a relevance rating of the electronic message in a recipient's device;
   receiving the relevance rating of the electronic message from the recipient of the electronic message via the recipient's device;
   crediting an incentive credit quantity to the recipient's account at the central credit repository;
   either crediting or deducting at least one credit from the sender's account at the central credit repository in accordance with the relevance rating of the electronic message; and
   when the sender's or recipient's account at the central credit repository is at an insufficient level, disabling the sender's or recipient's account to prevent the device being operated by a user of the sender's or recipient's account from utilizing electronic messaging in the closed network,
   wherein the quantity of credits to be expended is dependent on an identity of a recipient of the electronic message, and
   wherein the accounts at the central credit repository are analyzed to determine at least one of behavioral patterns and electronic messaging usage patterns of users.

2. The method of claim 1, further including:
   notifying the sender on the relevance rating of the electronic message,
   wherein the sender is able to receive an indication of a relevance of the electronic message to the recipient.

3. The method of claim 1, wherein the electronic message is selected from a group consisting of: electronic mails, short message service messages, instant messaging texts, and multimedia message service messages.

4. The method of claim 1, wherein the device is selected from a group consisting of: a desktop computer, a mobile phone, a notebook, a PDA, a media player, and a gaming console.

5. The method of claim 1, wherein the accounts at the central credit repository are topped up to a predetermined level after a fixed time period selected from a group consisting of: weekly, fortnightly, monthly, and quarterly.

6. The method of claim 1, wherein the relevance rating is in a form selected from a group consisting of: descriptive, numerical, and graphical.

7. The method of claim 1, wherein the recipient of the electronic message is associable with organizational hierarchy level, and
   wherein quantity of credits to be expended is one of increases and decreases in accordance with the organizational hierarchy level.

8. The method of claim 1, wherein the server comprising a central credit repository is in data communication with the closed network.

9. The method of claim 8, wherein receiving the relevance rating of the electronic message from the recipient of the electronic message via the recipient's device comprises receiving the relevance rating through the user interface and over the closed network.

* * * * *